(12) United States Patent
Sorrentino et al.

(10) Patent No.: US 9,717,085 B2
(45) Date of Patent: Jul. 25, 2017

(54) METHODS AND APPARATUSES FOR RADIO RESOURCE MANAGEMENT

(71) Applicant: Telefonaktiebolaget L M Ericsson (publ), Stockholm (SE)

(72) Inventors: Stefano Sorrentino, Solna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 14/442,185

(22) PCT Filed: Nov. 23, 2012

(86) PCT No.: PCT/SE2012/051294
§ 371 (c)(1),
(2) Date: May 12, 2015

(87) PCT Pub. No.: WO2014/081359
PCT Pub. Date: May 30, 2014

(65) Prior Publication Data
US 2015/0341934 A1    Nov. 26, 2015

(51) Int. Cl.
*H04W 4/00*        (2009.01)
*H04W 72/04*       (2009.01)
*H04W 72/12*       (2009.01)
*H04B 7/26*        (2006.01)
*H04L 27/26*       (2006.01)
(Continued)

(52) U.S. Cl.
CPC ...... *H04W 72/0453* (2013.01); *H04B 7/2656* (2013.01); *H04L 5/001* (2013.01); *H04L 27/2655* (2013.01); *H04W 56/001* (2013.01); *H04W 56/0045* (2013.01); *H04W 72/12* (2013.01); *H04L 5/0091* (2013.01)

(58) Field of Classification Search
None
See application file for complete search history.

(56) References Cited

U.S. PATENT DOCUMENTS

2003/0007471 A1*  1/2003  Terasawa ............. H04B 7/2668
                                                         370/335
2009/0257533 A1   10/2009  Lindoff et al.
2010/0215032 A1    8/2010  Jalloul et al.
(Continued)

FOREIGN PATENT DOCUMENTS

EP           1484873 A1    12/2004

*Primary Examiner* — Otis L Thompson, Jr.
(74) *Attorney, Agent, or Firm* — Coats & Bennett, PLLC

(57) ABSTRACT

A radio resource allocation method in a communication node is disclosed. The method comprises determining (424) that a first time reference or a first communication using a first component carrier has a time shift compared to a second time reference of a second communication using a second component carrier. The method further comprises determining (426) a duration of a communication sub-frame based on the time shift, and scheduling (428) the determined communication sub-frame on a first component carrier to a first communication device. The determined frame duration is equal to the time shift or equal to the normal sub-frame length minus the time shift so as to avoid any overlap or interference. Corresponding computer program product, arrangement, communication node and first communication device are also disclosed.

30 Claims, 5 Drawing Sheets

(51) Int. Cl.
*H04W 56/00* (2009.01)
*H04L 5/00* (2006.01)

(56) References Cited

U.S. PATENT DOCUMENTS

2011/0002270 A1* 1/2011 Himayat ................. H04L 12/66
 370/328
2012/0258706 A1* 10/2012 Yu ..................... H04W 56/0045
 455/426.1

* cited by examiner

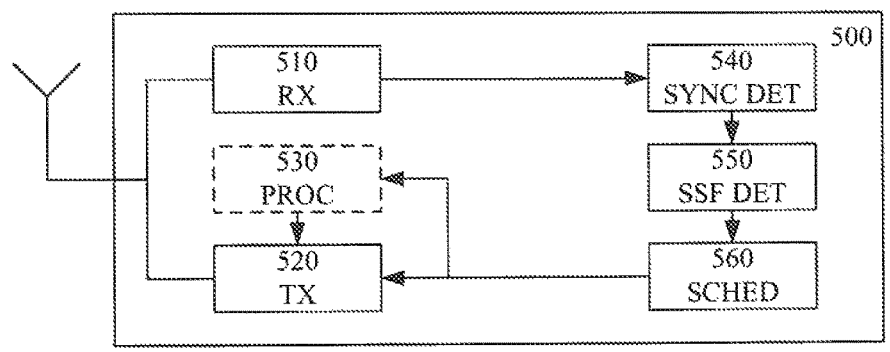
Fig. 5
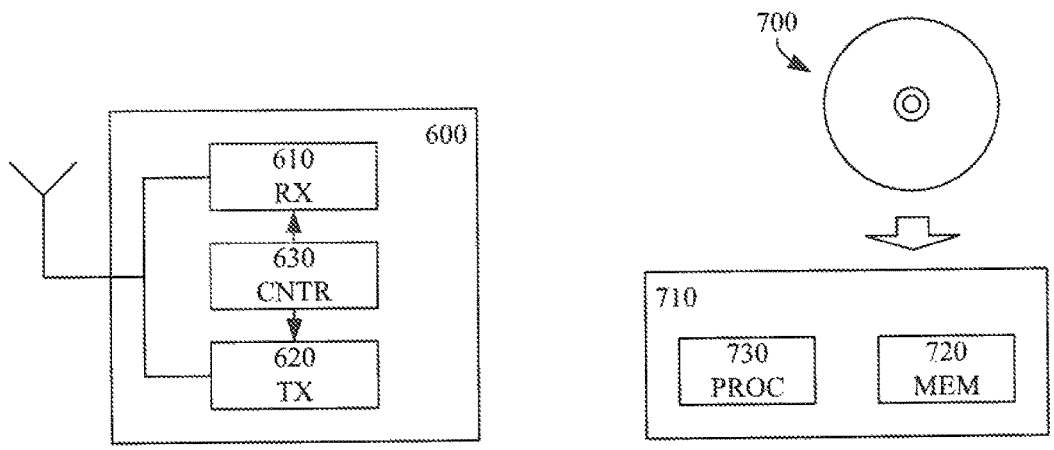
Fig. 6
Fig. 7

METHODS AND APPARATUSES FOR RADIO RESOURCE MANAGEMENT

TECHNICAL FIELD

The present embodiments relate generally to the field of radio resource management. More particularly, they relate to a method for radio resource allocation, a method for radio resource utilization, and apparatuses thereof in wireless communication systems.

BACKGROUND

To fully exploit the capacity of a communication system, it is typically desirable to optimize the utilization of the available radio resources. Thus, an available radio resource should not be left unused if system capacity is to be approached. Radio resources may include time resources, frequency resources, code resources, etc.

In a typical communication scenario, for example in a cellular communication network, a scheduler is involved for allocating the radio resources. For example, a radio resource may be allocated for uplink (UL) or downlink (DL) communication to a particular wireless communication terminal according to principles well known in the art.

One or more time references are typically upheld by a wireless communication device. A time reference may comprise an internal time reference or a time reference provided by a communication network.

Internal time references may be un-aligned with time references of other wireless communication devices. Likewise, time references (referring to the same or different component carriers) provided by different nodes of a communication network may be un-aligned.

When a typical scheduler allocates resources to one or more wireless communication devices and there is a misalignment between time references of the one or more wireless communication devices, the available radio resources will not be fully utilized. Several examples of such scenarios will be given below in the detailed description.

Therefore, there is a need for alternative and improved methods and arrangements of radio resource allocation/utilization. In particular, there is a need for such methods and arrangements that accommodate the situation when there is a misalignment between time references of one or more wireless communication devices to which radio resources are to be allocated.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide methods and arrangements of radio resource allocation suitable for situations with misaligned time references.

According to a first aspect, this is achieved by a radio resource allocation method of a communication node. The method comprises determining that a first time reference of a first data communication of a first communication device, wherein the first data communication uses a first component carrier, has a time shift compared to a second time reference of a second data communication of a second communication device, wherein the second data communication uses a second component carrier. The method further comprises determining a duration of a communication time interval based on the time shift, and scheduling the determined communication time interval on the first component carrier to the first communication device.

According to some embodiments, the method may also comprise transmitting a scheduling message indicating the duration of the communication time interval to the first communication device.

The communication time interval may, for example, be a communication sub-frame.

In some embodiments, the step of determining that there is a time shift between first and second time references comprises determining the time shift.

In some embodiments, the step of determining that there is a time shift between first and second time references is performed in response to receiving a scheduling request message from the first communication device.

The method may, according to some embodiments, comprise acquiring each of the first and second time references.

The respective time reference may, for example, be acquired by receiving a network signaling message from a network node of a cellular communication network, wherein the message indicates the time reference.

In some embodiments, the respective time reference may be acquired by performing measurements to determine the time reference. The measurements may be performed on signals from at least one of the first and second communication device. For example, measurements may be performed on signals from the first communication device to determine the first time reference and on signals from the second communication device to determine the second time reference.

According to some embodiments, the respective time reference may be acquired by receiving a report message from at least one of the first and second communication devices, wherein the message indicates the time reference. For example, a report message from the first communication device may indicate the first time reference and a report message from the second communication device may indicate the second time reference.

In cases when the communication node is the second communication device, as will exemplified further in the following, the second time reference is typically already known to the communication node.

In some embodiments, combinations of the above examples may be applied to acquire the respective time reference.

Determining the duration of the communication time interval based on the time shift may, according to some embodiments, comprise determining the duration to be equal to the time shift or determining the duration to be equal to a transmission time interval minus the time shift.

The indication of the duration may, according to some embodiments, further comprise at least one of an ending time of the communication time interval, a starting time of the communication time interval, and a time offset of the communication time interval.

In some embodiments, the communication node may be a network node of a cellular communication network.

For example, the communication node may be a macro node or a pico/micro node (exemplified by a pico node in this disclosure) of a heterogeneous cellular communication network with soft cell deployment. In such examples, the respective time references may be provided by macro nodes of the heterogeneous cellular communication network, the first data communication may be a communication between the first communication device and a pico node of the heterogeneous cellular communication network and the second data communication may be a communication between the second communication device and a pico node of the heterogeneous cellular communication network. The first and second data communication may comprise uplink (UL) communication and/or downlink (DL) communication.

Alternatively or additionally, the communication node may be a network node of a cellular communication network capable of providing network assistance to device-to-device communication. The network may or may not be a heterogeneous cellular communication network. In such examples, the respective time references may be provided by network nodes of the cellular communication network or may be internal time references of the communication devices, and the first and second data communication may be device-to-device communications between the first and second communication devices.

In other embodiments, the communication node may be a wireless communication terminal, e.g. the second communication device. For example, the communication node may be a device-to-device communication capable wireless device. In such examples, the respective time references may be provided by network nodes of a cellular communication network capable of providing network assistance to device-to-device communication or may be internal time references of the communication devices, and the first and second data communication may be device-to-device communications between the first and second communication devices.

Thus, according to some embodiments, the communication node is a first network node of a cellular communication network, the first communication is between the first communication device and the cellular communication network, and the second communication is between the second communication device and the cellular communication network. The first and second communication may, for example, be with the first network node or with another network node of the cellular communication network.

In some of these embodiments, the first component carrier is the same component carrier as the second component carrier, the first time reference is a synchronization of the first wireless communication device and the second time reference is a synchronization of the second wireless communication device. For example, the time references may be associated with a user equipment (UE) specific synchronization approach.

In other of these embodiments, the first communication device is the same device as the second communication device, the first time reference is a synchronization of the first component carrier, and the second time reference is a synchronization of the second component carrier. For example, the time references may be associated with a component carrier (CC) specific synchronization approach.

In some embodiments, the first and second devices are device-to-device communication capable devices and the first and second communications comprise device-to-device communication between the first and second communication devices, the first component carrier is the same component carrier as the second component carrier, the first time reference is a synchronization of the first communication device, and the second time reference is a synchronization of the second communication device. In these embodiments, the communication node may be the second communication device or a first network node of a cellular communication network.

In embodiments where the first data communication is a communication between the first communication device and the communication node, the method may further comprise transmitting data of the first data communication to the first communication device during the communication time interval and/or receiving data of the first data communication from the first communication device during the communication time interval.

A second aspect is a radio resource utilization method of a first communication device. The method comprises receiving a scheduling message indicating a duration of a communication time interval from a communication node, wherein the duration of the communication time interval is based on a time shift between a first time reference of a first data communication of the first communication device, wherein the first data communication uses a first component carrier, and a second time reference of a second data communication of a second communication device, wherein the second data communication uses a second component carrier. The method further comprises performing at least one of transmitting data of the first data communication during the communication time interval and receiving data of the first data communication during the communication time interval.

A third aspect is a computer program product comprising a computer readable medium, having thereon a computer program comprising program instructions. The computer program is loadable into a data-processing unit and adapted to cause execution of the method according to any of the first and second aspects when the computer program is run by the data-processing unit.

According to a fourth aspect, a radio resource allocation arrangement for a communication node is provided. The arrangement comprises a synchronization determiner, a time interval determiner, and a scheduler.

According to some embodiments, the arrangement may also comprise a receiver and a transmitter.

The synchronization determiner is adapted to determine that a first time reference of a first data communication of a first communication device, wherein the first data communication uses a first component carrier, has a time shift compared to a second time reference of a second data communication of a second communication device, wherein the second data communication uses a second component carrier.

The time interval determiner is adapted to determine a duration of a communication time interval based on the time shift and the scheduler is adapted to schedule the determined communication time interval to the first communication device.

The transmitter may be adapted to transmit a scheduling message indicating the duration of the communication time interval to the first communication device.

In some embodiments, the synchronization determiner is further adapted to determine the time shift.

The receiver may be adapted to receive a scheduling request message from the first communication device and the synchronization determiner may be adapted to determine that there is a time shift between first and second time references in response to the scheduling request.

The synchronization determiner may be adapted to acquire each of the first and second time references. At least one of the time references may be acquired based on output from the receiver according to some embodiments.

The receiver may be adapted to receive a network signaling message from a network node of a cellular communication network, wherein the message indicates the time reference.

Alternatively or additionally, the receiver may be adapted to receive a report message from at least one of the first and second communication devices, the message indicating the time reference.

Yet alternatively or additionally, the receiver may be adapted to receive measurement signals suitable for determining the time reference from at least one of the first and second communication devices. The arrangement may further comprise a measurement unit adapted to perform measurements on the measurement signals to determine the time reference.

In cases when the communication node is the second communication device, the second time reference is typically already known to the communication node.

In embodiments where the first data communication is a communication between the first communication device and the communication node, the transmitter may be further adapted to transmit data of the first data communication to the first communication device during the communication time interval, and/or the receiver may be further adapted to receive data of the first data communication from the first communication device during the communication time interval.

A fifth aspect is a communication node comprising the arrangement according to the fourth aspect. The communication node may, for example, be a network node of a cellular communication network or a second communication device.

According to a sixth aspect, a radio resource utilization arrangement for a first communication device is provided. The arrangement comprises a receiver adapted to receive a scheduling message indicating a duration of a communication time interval from a communication node, wherein the duration of the communication time interval is based on a time shift between a first time reference of a first data communication of the first communication device, wherein the first data communication uses a first component carrier, and a second time reference of a second data communication of a second communication device, wherein the second data communication uses a second component carrier. The arrangement also comprises a transmitter. At least one of the transmitter and the receiver is adapted to perform the first data communication during the communication time interval, the transmitter by transmitting data of the first data communication during the communication time interval and the receiver by receiving data of the first data communication during the communication time interval.

A seventh aspect is a first communication device comprising the arrangement according to the sixth aspect. In some embodiments, the first communication device of the seventh aspect may further comprise the arrangement of the fourth aspect.

Some embodiments are particularly applicable to devices for Evolved Universal Terrestrial Radio Access Networks (E-UTRAN).

In some embodiments, the second, third, fourth and sixth aspects may additionally have features identical with or corresponding to any of the various features as explained above for the first aspect.

An advantage of some embodiments is that available radio resources may be more efficiently utilized. This is particularly prominent for situations with misaligned time references.

By properly employing variable communication time interval duration based on time shift between a first and second time reference, a cellular communication network may more fully exploit the available radio resources.

Furthermore, a wireless communication device (in network communication or in device-to-device communication) may be provided with a possibility to approach its peak rate when some embodiments are applied. This possibility may be independent of, for example, limitations of the device in carrier aggregation support.

BRIEF DESCRIPTION OF THE DRAWINGS

Further objects, features and advantages will appear from the following detailed description of embodiments, with reference being made to the accompanying drawings, in which:

FIG. 5 is a block diagram illustrating an example arrangement according to some embodiments;

FIG. 6 is a block diagram illustrating an example arrangement according to some embodiments; and FIG. 7 is a schematic drawing illustrating a computer readable medium according to some embodiments.

DETAILED DESCRIPTION

In the following, embodiments will be described where communication time intervals (e.g. sub-frames) with adaptive duration are applied. The time interval duration is adapted based on a time shift between a first time reference and a second time reference.

In a typical traditional communication system, users associated with the same scheduler are also provided with the same time reference. For example, a base station controller comprising a scheduler may synchronize its associated base stations to transmit a synchronized time reference to all communication devices in the base station coverage area.

However, as will be exemplified in the following, there are many situations when such synchronized time references cannot be assumed and this may become more and more common in the deployment of heterogeneous networks, self-optimizing networks and device-to-device communication to name a few examples.

Figure 1A:
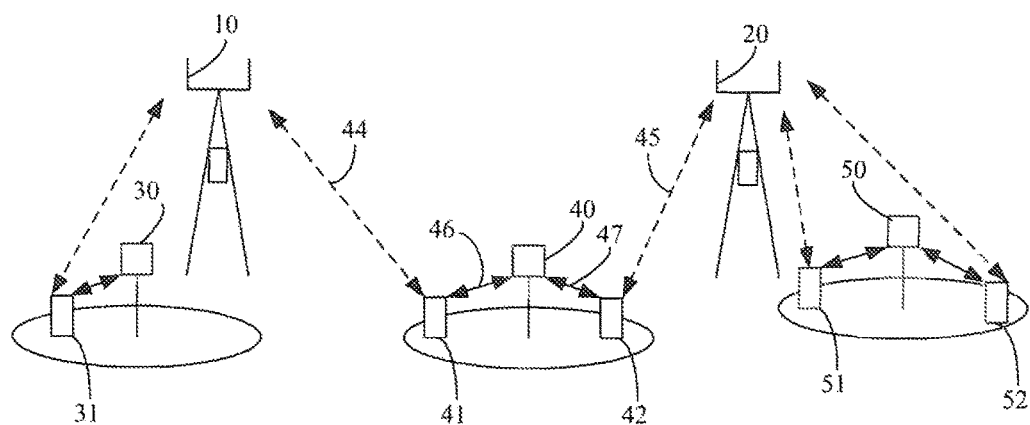
FIG. 1A is a schematic drawing illustrating a heterogeneous network deployment.

FIG. 1A illustrates a schematic deployment of a heterogeneous network. A heterogeneous network or heterogeneous deployment typically comprises network nodes operating at different transmit power and with overlapping coverage areas. In such a deployment, the low-power (pico) nodes are typically assumed to offer high data rates (e.g. several Mbit/s) and provide high capacity (e.g. in users/m$^2$ or Mbit/s/m$^2$) in local areas, while the high-power (macro) nodes are assumed to provide full-area coverage.

The schematic illustration of FIG. 1A shows two macro nodes 10, 20, e.g. typical base stations (such as eNodeBs) of a cellular communication network. The illustration also shows three pico nodes 30, 40, 50 each having a coverage area that is typically much smaller than the coverage area of a macro node, and is overlapping the coverage area of one or more macro nodes.

The pico node 30 has a wireless communication device 31 in its coverage area, the pico node 40 has two wireless communication devices 41, 42 in its coverage area, and the pico node 50 has two wireless communication devices 51, 52 in its coverage area.

In a traditional heterogeneous deployment each pico node creates a cell of its own (a pico cell). Thus, in addition to downlink and uplink data transmission and reception, the traditional pico node also transmits the full set of common signals and channels associated with a cell. For E-UTRAN this transmission (using the carrier of the pico node) includes the primary and secondary synchronization signals, cell-specific reference signals and system information related to the cell.

In an alternative deployment, however, a wireless communication device in range of a pico node may be simultaneously connected to both the pico node and a macro node as illustrated in FIG. 1A. Thus, the wireless communication device 41 is connected to the pico node 40 (illustrated by connection 46) and to the macro node 10 (illustrated by connection 44) and the wireless communication device 42 is connected to the pico node 40 (illustrated by connection 47) and to the macro node 20 (illustrated by connection 45). Generally, macro and pico transmission can either occur on different frequencies (frequency-separated deployment) or on the same frequency (same-frequency deployment).

Typically in such a scenario—also referred to as a soft cell deployment—the wireless communication device maintains an anchor carrier to the macro node, which may be used for e.g. system information and radio-resource control (RRC) such as mobility, and a booster carrier the pica node, which may be primarily used for data transmission.

Operation of the soft cell concept is typically flexible in deployments. In one example, a synchronized network where one pico layer complements communication for a number of wireless communication devices simultaneously connected to various macro layers as exemplified in FIG. 1A. The term macro layer typically indicates the transmission layer (i.e. the logical node) that provides system information to the wireless communication device.

It should be noted that, even though the case where each wireless communication device is connected to a single macro layer is used as an example herein, embodiments may be equally applicable to the case where one or more wireless communication devices are simultaneously connected to multiple macro layers or pico layers. Generally, embodiments may be applicable to any case where wireless communication devices associated with different timing references operate on the same carrier and to any case when wireless communication devices with a single transceiver operate on different carriers having different carrier-specific timing as will be exemplified herein.

Since a wireless communication device in a soft cell scenario may be connected to the network on two carriers typically transmitted from two different nodes (macro and pico), the wireless communication device should typically be able to receive from and transmit to both the nodes. Uplink information for any of the nodes may comprise signaling required to operate the downlink and/or user data.

This approach has several benefits over traditional heterogeneous networks, e.g. mobility robustness (ensured by the reliable coverage of the macro nodes), improved energy efficiency and interference reduction (since the pico nodes may be inactive when there is no data communication). Since the macro layer is responsible for providing e.g. system information and basic mobility management the pico node only needs to be active during data communication with the wireless communication device.

However, there are also some complications associated with the soft cell deployment. Since the synchronization signals and other system information is transmitted by the macro nodes while all or much of the data transmission takes place between the pico node and the wireless communication device, and since the macro nodes may not be perfectly mutually synchronized, there may be misaligned time references applicable to the scheduling of data communication. For some network synchronization options (e.g. UE specific synchronization or CC specific synchronization, which will be explained in connection to FIGS. 2A and 2B respectively) it is not possible for the network to fully exploit the available time/frequency resources.

Figure 1B:
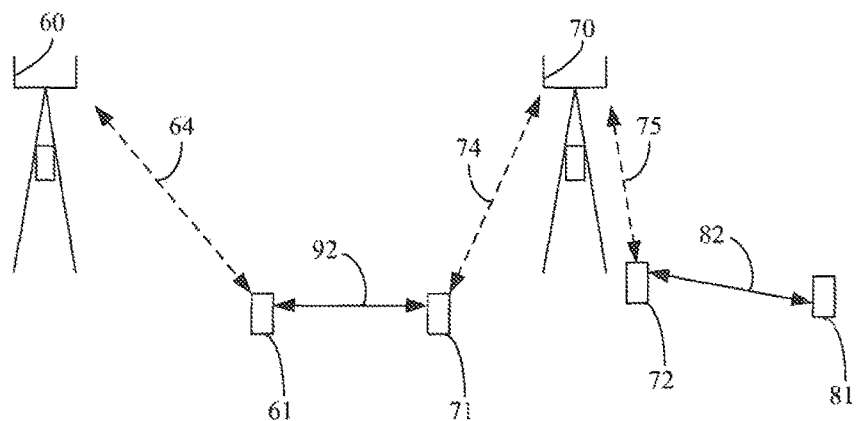
FIG. 1B is a schematic drawing illustrating a network assisted device-to-device communication scenario.

FIG. 1B is a schematic illustration of a network assisted device-to-device communication scenario. The illustration shows two network nodes 60, 70, e.g. typical base stations (such as eNodeBs) of a cellular communication network or any other network nodes capable to providing network assistance to device-to-device communication.

The network node 60 has a wireless communication device 61 in its coverage area and the network node 70 has two wireless communication devices 71, 72 in its coverage area. A wireless communication device 81 is not connected to any network node, e.g. because it is out-of-coverage of the cellular communication network.

The wireless communication devices 61 and 71 are in device-to-device communication with each other (illustrated by connection 92) and the wireless communication devices 72 and 81 are in device-to-device communication with each other (illustrated by connection 82).

The network node 60 may provide the wireless communication device 61 with network assistance (e.g. various control signaling such as a time reference) related to the device-to-device communication. Thus, the network node 60 may be connected to the wireless communication device 61 (illustrated by connection 64). Similarly, the network node 70 may provide network assistance to the wireless communication devices 71 and 72 (illustrated by connections 74 and 75 respectively).

Since a time reference is transmitted by the network nodes (which may not be perfectly mutually synchronized), and since device-to-device communication may take place between devices connected to different network nodes, there may be misaligned time references applicable to the device-to-device communication. For example, the wireless communication devices 61 and 71 may have different time references (supplied from network node 60 and 70 respectively). Similarly, the time reference of the wireless communication device 72 (supplied from network node 70) may differ from the time reference of the wireless communication device 81 (an internal time reference). Thus, for devices that cannot transmit and receive simultaneously, there will be a radio resource loss due to the time reference misalignment. A typical example will be explained in connection to FIG. 2C.

Figure 2A:
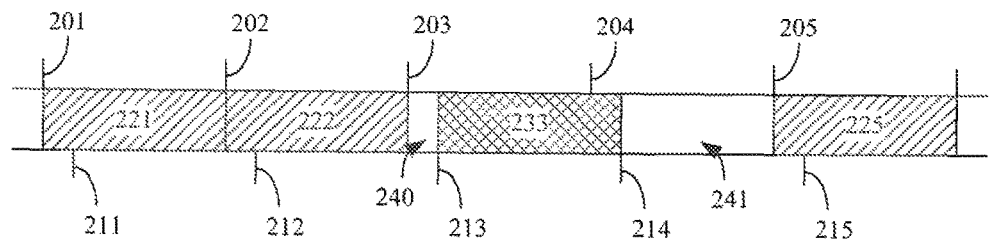
FIG. 2A is a timing diagram illustrating a resource allocation problem for a user equipment (UE) specific synchronization approach.
Figure 2B:
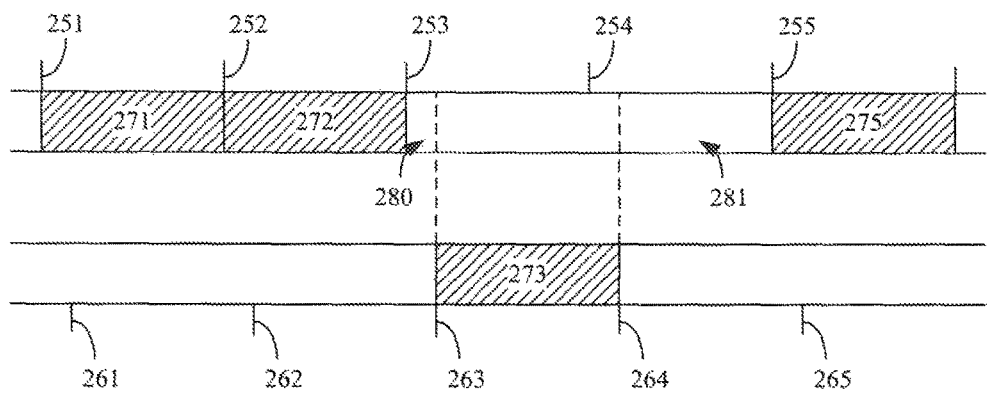
FIG. 2B is a timing diagram illustrating a resource allocation problem for a component carrier (CC) specific synchronization approach.

The schematic timing diagrams of FIGS. 2A and 2B illustrate two problematic scenarios that may be experienced, for example, in a soft cell heterogeneous deployment. In both scenarios, radio resources are not utilized in full due to misaligned time references applicable to the scheduling of data communication.

FIG. 2A illustrate a scenario with UE specific synchronization. In a UE specific synchronization approach, each wireless communication device (e.g. UE) acquires its time synchronization from a specific signaling layer (e.g. typically the macro layer) and applies the reference timing of the acquired time synchronization to all layers. Thus, the same time reference (acquired from e.g. a macro node) is used for all communication (with e.g. macro and pica nodes) by that wireless communication device. Timing advance may be applied in the uplink to compensate for propagation delay.

In the example illustrated in FIG. 1A, a UE specific synchronization approach may be manifested in that the wireless communication device 41 acquires its time reference from the macro node 10 (via the connection 44) and applies that time reference also to data communication with the pico node 40 (via the connection 46), while the wireless communication device 42 acquires its time reference from the macro node 20 (via the connection 45) and applies that time reference also to data communication with the pico node 40 (via the connection 47). Thus, if the macro nodes 10 and 20 are not synchronized (which is assumed in this example) the pico node 40 would have to manage data communication using two misaligned timing references.

In FIG. 2A, an example manifestation of such a misalignment in time references is illustrated for scheduling of multiple wireless communication devices in a time multiplexed manner on the same component carrier. The timing reference of a first communication device (e.g. a UE) is illustrated by timing indicators 201, 202, 203, 204, 205 and the timing reference of a second communication device (e.g. a UE) is illustrated by timing indicators 211, 212, 213, 214, 215. Due to the time reference misalignment, the timing indicators of the first device have a time shift compared to the timing indicators of the second device. The timing indicators may, for example, represent starting times of a sub-frame transmission or reception (depending on whether FIG. 2A represents the uplink or the down link). The timing indicators may alternatively represent any other suitable system timing such as starting or ending times of a slot, a frame, a transmission time interval, etc.

Data communication of the first wireless communication device is illustrated by 221, 222, 225 and data communication of the second wireless communication device is illustrated by 233. Each data communication occasion starts and ends at a timing indicator of the respective wireless communication device. Due to the time shift between the timing references of the devices, there is a loss of network spectral efficiency, i.e. the radio resources cannot be utilized optimally. This can be seen in the example of FIG. 2A in that the time intervals 240 and 241 are unused. Time interval 240 cannot be used by the first device since that usage would collide with the usage 233 by the second device. Similarly, it cannot be used by the second device since that usage would collide with the usage 222 by the first device. Time interval 241 cannot be used by the first device since that usage would collide with the usage 233 by the second device. Similarly, it cannot be used by the second device since that usage would collide with the usage 225 by the first device. Thus, when time references of different wireless communication devices are misaligned and these wireless communication devices are to be scheduled using time division on the same frequency resource, the scheduling function (typically in a network node, e.g. the pico node 40 of FIG. 1A) cannot fully exploit the available radio resources.

FIG. 2B illustrate a scenario with component carrier (CC) specific synchronization. In a CC specific synchronization approach, each wireless communication device acquires time synchronization for each applicable component carrier.

For example, different macro nodes may operate on different component carriers. In such scenarios, the device may thus acquire one timing reference relating to one component carrier from a specific macro node and acquire another timing reference relating to another component carrier from a another macro node.

In some scenarios, the different signaling layers (e.g. macro and pico layer) operate on different carrier frequencies. In such scenarios, the device may thus acquire one timing reference relating to one component carrier from a specific signaling layer (e.g. the macro layer) and acquire another timing reference relating to another component carrier from a another signaling layer (e.g. the pico layer).

Since the component carriers may be associated to geographically separated locations (e.g. macro node and pico node location) and the nodes of these locations may not be completely synchronized, the time reference for the different component carriers may be differ at the wireless communication device. Thus, different time references may be used for communication by that wireless communication device depending on the applicable component carrier used.

In the example illustrated in FIG. 1A, a CC specific synchronization approach may be manifested in that the wireless communication device 41 acquires one time reference from the macro node 10 (via the connection 44) that uses one component carrier and acquires another time reference from the pico node 40 (via the connection 46) that uses another component carrier. Thus, if the macro node 10 and the pico node 40 are not synchronized (which is assumed in this example) communication between the wireless communication device 41 and the macro node 10 would use a different time reference than communication between the wireless communication device 41 and the pico node 40. This may pose problem, for example, in carrier aggregation scenarios.

In the example illustrated in FIG. 1A, an alternative CC specific synchronization approach may be manifested in that the wireless communication device 41 acquires one time reference from the macro node 10 (via the connection 44) that uses one component carrier and acquires another time reference from the macro node 20 (via a connection not shown) that uses another component carrier. Both time references may then be used in data communication between the wireless communication device 41 and the pico node 40 if the pico node operates on both component carriers. Thus, if the macro nodes 10 and 20 are not synchronized (which is assumed in this example) communication between the wireless communication device 41 and the pico node 40 would use two different time references which may pose problem, for example, in carrier aggregation scenarios.

In FIG. 2B, an example manifestation of such a misalignment in time references is illustrated for scheduling of a wireless communication devices in a time multiplexed manner on two different component carriers. The upper timing diagram illustrate scheduling on a first component carrier (e.g. of the pico node 40 in FIG. 1A) and the lower timing diagram illustrate scheduling on a second component carrier (e.g. of the macro node 10 in FIG. 1A according to the first example above or of the pico node 40 in FIG. 1A).

The timing reference of the first component carrier is illustrated by timing indicators 251, 252, 253, 254, 255 and the timing reference of the second component carrier is illustrated by timing indicators 261, 262, 263, 264, 265. Due to the time reference misalignment, the timing indicators of the first carrier have a time shift compared to the timing indicators of the second carrier. The timing indicators may, for example, represent starting times of a sub-frame transmission or reception (depending on whether FIG. 2B represents the uplink or the down link). The timing indicators may alternatively represent any other suitable system timing such as starting or ending times of a slot, a frame, a transmission time interval, etc.

Data communication of the wireless communication device is illustrated by 271, 272, 273, 275. Each data communication occasion starts and ends at a timing indicator of the respective component carrier. Due to the time shift between the timing references of the component carriers, there is a loss of spectral efficiency of the wireless communication device, i.e. the radio resources cannot be utilized optimally, if the data communication of the wireless device utilizes both component carriers in a time multiplexed manner (e.g. in a carrier aggregation scenario). This can be seen in the example of FIG. 2B in that the time intervals 280 and 281 of the first component carrier are unused when the communication of the device temporarily takes place on the second component carrier as illustrated by 273. Time intervals 280, 281 cannot be used by the device if it cannot communicate on multiple component carriers simultaneously, since that usage would collide with the communication 273 on the second component carrier. A wireless communication device may be limited in the number of component carriers for simultaneous reception and/or transmission due to, for example, constraints (e.g. due to cost and/or complexity reasons) in the implementation. Thus, when time references of different component carriers are misaligned and a wireless communication device may be scheduled using time division on both component carriers, the scheduling function cannot fully exploit the available radio resources for the wireless communication device and the throughput of the device is decreased.

A similar situation as the one shown in FIG. 2B may arise for a device that does not support full duplex (i.e. cannot transmit and receive simultaneously in a frequency division duplex (FDD) system) and when the timing reference of the transmit frequency differs from the timing reference of the receive frequency.

Figure 2C:
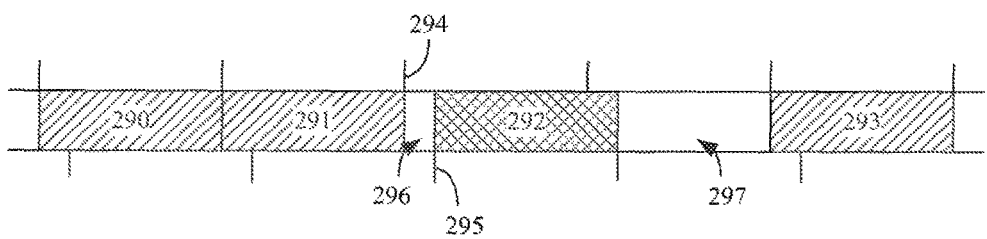
FIG. 2C is a timing diagram illustrating a resource allocation problem for a device-to-device communication scenario.

The schematic timing diagram of FIG. 2C illustrates a problematic scenario that may be experienced in a device-to-device communication scenario. In this scenario, radio resources are again not utilized in full due to misaligned time references applicable to the scheduling of data communication.

FIG. 2C illustrate a scenario with device specific synchronization for a device-to-device communication scenario. For example, the devices involved in the device-to-device communication may acquire their respective time references from different (un-synchronized) network nodes in a network assisted device-to-device communication system and/or one or more of the devices involved in the device-to-device communication may not acquire any time reference at all from any network node (e.g. if it is out-of-coverage or chooses to keep its own internal time reference). Thus, two devices involved in device-to-device communication may use different, misaligned, time references.

In the example illustrated in FIG. 1B, a device specific synchronization for a device-to-device communication scenario may be manifested in that the wireless communication device 61 acquires its time reference from the macro node 60 (via the connection 64) while the wireless communication device 71 acquires its time reference from the macro node 70 (via the connection 74), and these time references are applied in the device-to-device communication via the connection 92. The network nodes 60, 70 may or may not belong to the same cellular communication network. A device specific synchronization for a device-to-device communication scenario may also be manifested in that the wireless communication device 72 acquires its time reference from the macro node 70 (via the connection 75) while the wireless communication device 81 keeps its own internal time reference, and these time references are applied in the device-to-device communication via the connection 82.

In FIG. 2C, an example manifestation of a misalignment in the time references is illustrated for scheduling of device-to-device communication between two devices in a time multiplexed manner on the same component carrier. The timing reference of a first communication device is illustrated by timing indicator 294 and the timing reference of a second communication device is illustrated by timing indicator 295. Due to the time reference misalignment, the timing indicators of the first device have a time shift compared to the timing indicators of the second device. The timing indicators may, for example, represent starting times of a sub-frame transmission or reception. The timing indicators may alternatively represent any other suitable system timing such as starting or ending times of a slot, a frame, a transmission time interval, etc.

Data transmission of the first wireless communication device is illustrated by 290, 291, 293 and data transmission of the second wireless communication device (i.e. data reception of the first wireless communication device) is illustrated by 292. Each data communication occasion starts and ends at a timing indicator of the respective wireless communication device. Due to the time shift between the timing references of the devices, there is a loss of device-to-device communication spectral efficiency, i.e. the radio resources cannot be utilized optimally. This can be seen in the example of FIG. 2C in that the time intervals 296 and 297 are unused. Time interval 296 cannot be used by the first device since that usage would collide with the usage 292 by the second device. Similarly, it cannot be used by the second device since that usage would collide with the usage 291 by the first device. Time interval 297 cannot be used by the first device since that usage would collide with the usage 292 by the second device. Similarly, it cannot be used by the second device since that usage would collide with the usage 293 by the first device. Thus, when time references of different wireless communication devices are misaligned and these wireless communication devices are to be scheduled using time division on the same frequency resource, the scheduling function (typically in a network node, e.g. any of the macro nodes 60 or 70 of FIG. 1B, or in any of the wireless communication devices involved in the device-to-device communication) cannot fully exploit the available radio resources.

A similar situation as the one shown in FIG. 2C may arise even when the device-to-device communication is frequency duplexed if at least one of the devices involved in the device-to-device communication does not support full duplex (i.e. cannot transmit and receive simultaneously in a frequency division duplex (FDD) system) and when the timing references of the devices involved in the device-to-device communication are misaligned.

According to some embodiments, a shortened communication time interval with variable duration is introduced. Application of such a dynamic communication time interval addresses the under utilization of available radio resources due to misaligned time references, as exemplified in FIGS. 2A-C. By proper application of the shortened communication time intervals, a network may more fully exploit the available resources and/or a wireless communication device may approach or reach its peak rate (independently of possible device limitations in carrier aggregation support).

The shortened communication time interval may have the same starting time reference as a conventional communication time interval (for the applicable device on the applicable layer) and consist of a smaller number of consecutive symbols than the conventional communication time interval.

Alternatively, the shortened communication time interval may have the same ending time reference as a conventional communication time interval (for the applicable device on the applicable layer) and consist of a smaller number of consecutive symbols than the conventional communication time interval. In this alternative, the starting point of the shortened communication time interval does not correspond to the nominal starting point for a conventional communication time interval.

In some applications (e.g. E-UTRAN applications), the dynamic communication time interval may comprise a shortened sub-frame, i.e. a sub-frame with a different length than a nominal one transmission time interval (TTI). The term sub-frame will be used in various examples herein without being intended as limiting.

In such applications, the shortened sub-frame may have a duration of a fractional number of orthogonal frequency division multiplex (OFDM) symbols or single carrier orthogonal frequency division multiplex (SC-OFDM) symbols.

Reference signals (RS) may have a different structure for the shortened sub-frames than for a conventional sub-frame, e.g. depending on the duration and/or time shift of the shortened sub-frame. In order to allow multiplexing with conventional sub-frames reference signals in the shortened sub-frame may be placed in the resource elements (RE) that correspond to reference signal placement in a conventional sub-frame. Mapping of control channels and signals (e.g., Physical Downlink Control CHannel—PDCCH, enhanced Physical Downlink Control Channel—ePDCCH, Broadcast Channel—BCH, Primary and Secondary Synchronization Signals—PSS and SSS) to shortened sub-frames may also vary depending on the timing and duration of the shortened sub-frames.

According to some embodiments, only some shortened sub-frame applications may be supported (e.g. the shortened sub-frame may only occupy the 1st or 2nd slot in E-UTRAN applications). Such limitations may, for example, provide a trade-off between the achieved spectral efficiency and the required signaling amount, system complexity, etc.

The data content of a conventional sub-frame may be mapped to a shortened sub-frame in any suitable way. For example, the data content of a conventional sub-frame may be rate matched to fit the number of resource elements allocated to the shortened sub-frame. Alternatively or additionally, the coded data content of a conventional sub-frame may be punctured to fit the number of resource elements allocated to the shortened sub-frame.

The shortened sub-frame may, according to some embodiments, be defined as a partial utilization of a corresponding conventional sub-frame. The partial utilization may be limited in the time domain to, for example, the initial part of the corresponding conventional sub-frame or the ending part of the corresponding conventional sub-frame. The duration of the shortened sub-frame may consist of an integer or fractional number of symbols (e.g. OFDM symbols). Resource elements of the shortened sub-frame may have the same content (with the corresponding rate matching and modulation) as would the corresponding resource elements of the corresponding conventional sub-frame have if it was transmitted.

Figure 3A:
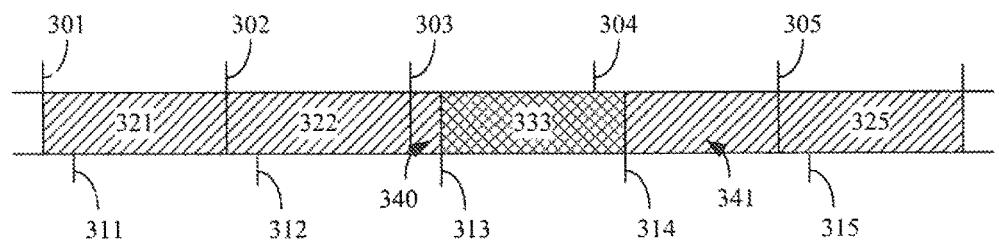
FIG. 3A is a timing diagram illustrating example resource allocation for a user equipment (UE) specific synchronization approach according to some embodiments.

FIG. 3A illustrates how a dynamically shortened communication time interval may improve the network spectral efficiency, i.e. the radio resource utilization, in the scenario described in connection to FIG. 2A.

The timing reference of the first communication device is illustrated by timing indicators 301, 302, 303, 304, 305 and the timing reference of the second communication device is illustrated by timing indicators 311, 312, 313, 314, 315.

Data communication of the second wireless communication device is illustrated by 333. Data communication of the first wireless communication device is illustrated by 321, 322, 325 and by shortened communication sub-frames adapted to fit into the time intervals 340 and 341. Alternatively, one or more of the time intervals 340 and 341 may comprise data communication of the second wireless communication device instead.

The data communication occasions of the shortened communication sub-frames do not necessarily start and end at a timing indicator of the respective wireless communication device. The data communication occasion of time interval 340 starts at a timing indicator of the first wireless communication device, ends at a timing indicator of the second wireless communication device and has a duration that correspond to the time shift between the time references first and second wireless communication devices. The data communication occasion of time interval 341 starts at a timing indicator of the second wireless communication device, ends at a timing indicator of the first wireless communication device and has a duration that correspond to a conventional sub-frame length (e.g. a transmission time interval) minus the time shift between the time references first and second wireless communication devices.

It may be noted in the example of FIG. 3A that application of the dynamic shortened communication sub-frames provides for a reduced loss in network spectral efficiency, i.e. the radio resources can be utilized optimally, despite the time shift between the timing references of the devices.

Figure 3B:
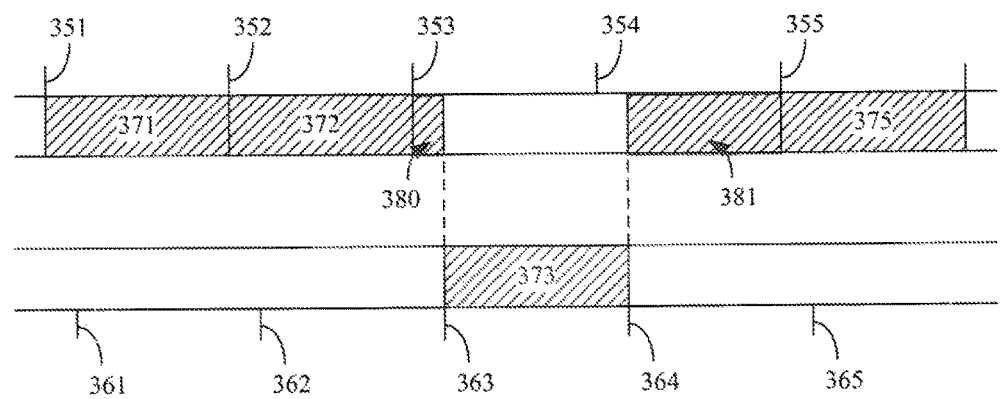
FIG. 3B is a timing diagram illustrating example resource allocation for a component carrier (CC) specific synchronization approach according to some embodiments.

FIG. 3B illustrates how a dynamically shortened communication time interval may improve the spectral efficiency of the wireless communication device, i.e. the radio resource utilization, in the scenario described in connection to FIG. 2B.

The timing reference of the first component carrier is illustrated by timing indicators 351, 352, 353, 354, 355 and the timing reference of the second component carrier is illustrated by timing indicators 361, 362, 363, 364, 365.

Data communication of the wireless communication device is illustrated by 371, 372, 373, 375 and by shortened communication sub-frames adapted to fit into the time intervals 380 and 381.

The data communication occasions of the shortened communication sub-frames do not necessarily start and end at a timing indicator of the respective component carrier. The data communication occasion of time interval 380 starts at a timing indicator of the first component carrier, ends at a timing indicator of the second component carrier and has a duration that correspond to the time shift between the time references first and second component carriers. The data communication occasion of time interval 381 starts at a timing indicator of the second component carrier, ends at a timing indicator of the first component carrier and has a duration that correspond to a conventional sub-frame length (e.g. a transmission time interval) minus the time shift between the time references first and second component carriers.

It may be noted in the example of FIG. 3B that application of the dynamic shortened communication sub-frames provides for a reduced loss in spectral efficiency for the wireless communication device, i.e. the radio resources can be utilized optimally and throughput may be increased, despite the time shift between the timing references of the component carriers.

Figure 3C:
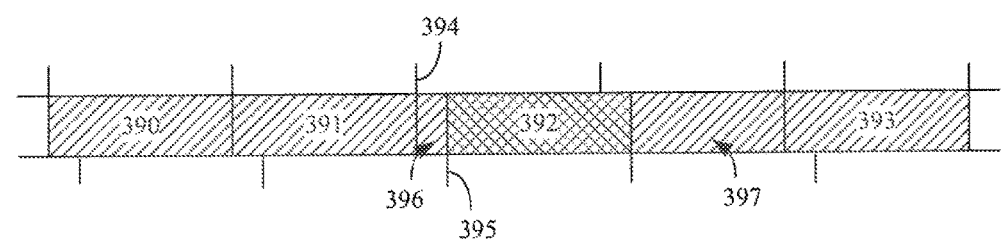
FIG. 3C is a timing diagram illustrating example resource allocation for a device-to-device communication scenario approach according to some embodiments.

FIG. 3C illustrates how a dynamically shortened communication time interval may improve the radio resource utilization in the device-to-device communication scenario described in connection to FIG. 2C.

The timing reference of the first communication device is illustrated by timing indicator 394 and the timing reference of the second communication device is illustrated by timing indicator 395.

Data transmission of the second wireless communication device is illustrated by 392. Data transmission of the first wireless communication device is illustrated by 390, 391, 393 and by shortened communication sub-frames adapted to fit into the time intervals 396 and 397. Alternatively, one or more of the time intervals 396 and 397 may comprise data transmission of the second wireless communication device instead.

The data communication occasions of the shortened communication sub-frames do not necessarily start and end at a timing indicator of the respective wireless communication device. The data communication occasion of time interval 396 starts at a timing indicator of the first wireless communication device, ends at a timing indicator of the second wireless communication device and has a duration that correspond to the time shift between the time references first and second wireless communication devices. The data communication occasion of time interval 397 starts at a timing indicator of the second wireless communication device, ends at a timing indicator of the first wireless communication device and has a duration that correspond to a conventional sub-frame length (e.g. a transmission time interval) minus the time shift between the time references first and second wireless communication devices.

It may be noted in the example of FIG. 3C that application of the dynamic shortened communication sub-frames provides for an improved utilization of the radio resources despite the time shift between the timing references of the devices.

Thus, according to a radio resource allocation method of a communication node, it is determined that a first time reference of a first data communication of a first communication device, wherein the first data communication uses a first component carrier, has a time shift compared to a second time reference of a second data communication of a second communication device, wherein the second data communication uses a second component carrier. The communication node then determines a duration of a communication time interval based on the time shift, schedules the determined communication time interval on the first component carrier to the first communication device, and transmits a scheduling message indicating the duration of the communication time interval to the first communication device.

The first communication device receives the scheduling message indicating the duration of the communication time interval and transmits and/or receives data of the first data communication during the time interval.

In the scenario of FIGS. 1A and 3A, the first component carrier would be the same component carrier as the second component carrier, the communication node would be a scheduling network node of the cellular communication network (typically the pico node 40, or possibly one of the macro nodes 10, 20), and the first and second communication devices would be the devices 41 and 42 respectively. The first communication 321, 322, 340, 341, 325 would be between the first communication device 41 and the pico node 40, and the second communication 333 would be between the second communication device 42 and the pico node 40.

In the scenario of FIGS. 1A and 3B, the first communication device 41 would be the same as the second communication device, and the communication node would be a scheduling network node of the cellular communication network (typically the pico node 40, or possibly one of the macro nodes 10, 20). The first communication 371, 372, 380, 381, 375 would be on the first component carrier, and the second communication 373 would be on the second component carrier.

In the scenario of FIGS. 1B and 3C, the first component carrier would be the same component carrier as the second component carrier, the first and second communication devices would be the devices 61 and 71 respectively, and the communication node would be a scheduling node (typically a network node of the cellular communication network such as one of the nodes 60, 70, or possibly one of the devices involved in the device-to-device communication such as the second communication device 71). The first communication 390, 391, 396, 397, 393 would be device-to-device communication transmission by the first communication device 61 to the second communication device 71, and the second communication 392 would be device-to-device communication transmission by the second communication device 71 to the first communication device 61.

Figure 4:
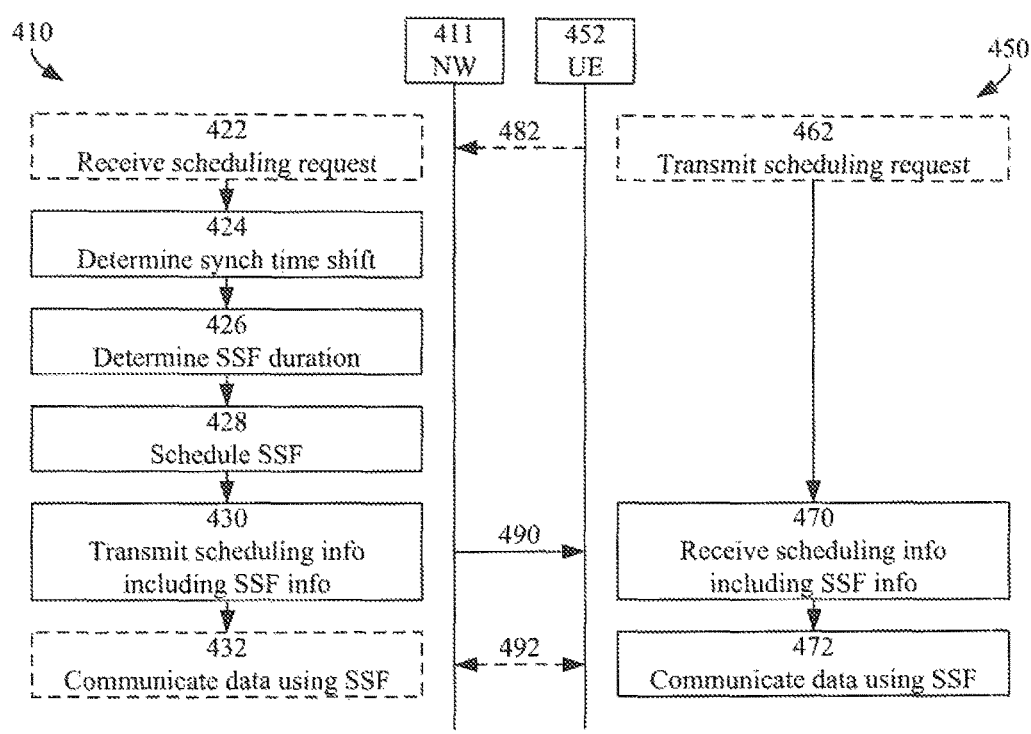
FIG. 4 is a flowchart illustrating example method steps according to some embodiments.

FIG. 4 illustrates an example method 410 that may be performed by the communication node, an example method 450 that may be performed by the first communication device, and example signaling between the communication node and the communication device.

As mentioned before, the communication node may be a scheduling network node (e.g. the pico node 40 of FIG. 1A or any of the nodes 60, 70 of FIG. 1B) or a scheduling wireless communication device (e.g. the device 71 of FIG. 1B). FIG. 4 illustrates the first alternative. Thus, the example method 410 is performed by a network node (NW) 411 and the example method 450 is performed by a wireless communication device (UE) 452 (compare with the first wireless communication devices 41 and 61 of FIGS. 1A and 1B respectively).

In some embodiments, the device 452 initiates the process of FIG. 4 in step 462 by transmitting a scheduling request message 482, which is received by the network node 411 in step 422. These steps are not applicable to all embodiments. For example, the network node may schedule downlink data transmissions without first receiving any scheduling request.

Furthermore, scheduling requests are not necessarily transmitted in device-to-device communication scenarios.

The network node 411 determines in step 424 that there is a time shift between different applicable time references. For example, as has been exemplified earlier, different devices may have different time references and/or different component carriers may have different time references.

In step 426, the network node 411 determines the duration of a shortened communication time interval (e.g. a shortened sub-frame (SSF)) based on the determined time shift.

The shortened communication time interval is scheduled to the device 452 by the network node 411 in step 428, and in step 430 the network node 411 transmits a scheduling message 490 including scheduling information indicating the duration of the shortened communication time interval. The scheduling message 490 is received by the device 452 in step 470.

The scheduling message 490 may be a scheduling grant message. The scheduling grant message may include the duration of the shortened communication time interval, and either the starting time or the ending time of the shortened communication time interval is implied as being the same as for a conventional communication time interval. Alternatively, the scheduling grant message may include the duration of the shortened communication time interval and the ending time. The ending time may be given in relation to a conventional communication time interval ending time. Yet alternatively, the scheduling grant message may include the duration of the shortened communication time interval and the starting time. The starting time may be given in relation to a conventional communication time interval starting time, i.e. expressed as the determined time shift.

The device 452 uses the shortened communication time interval for communication (transmission and/or reception) in step 472. The communication in step 472 may with the network node 411 as illustrated by 492 and step 432, or with another network node or wireless communication device.

To determine that there is a time shift in step 424, the network node should typically be aware of the applicable time references. In cases when the communication node is a scheduling wireless communication device (e.g. the device 71 of FIG. 1B), its own time reference is typically already known to the communication node. The communication node may acquire the applicable time references that are not already known to it by any suitable known or future method.

For example, a time reference may be acquired by receiving a network signaling message from a network node indicating the time reference applicable for that network node. Alternatively or additionally, a time reference may be acquired by performing measurements on signals from the communication device applying the time reference. Yet alternatively or additionally, a time reference may be acquired by receiving a report message from a communication device indicating the time reference applied by that device.

In some embodiments (for example a device-to-device communication scenario) when the communication node is a scheduling wireless communication device, a method similar to method 410 may be performed by the scheduling wireless communication device. FIG. 4 may be applicable to such a situation as well, inserting the scheduling wireless communication device in place of the network node 411.

FIG. 5 schematically illustrates an example arrangement 500 according to some embodiments. The arrangement may, for example, be comprised in a communication node such as the network node 411 of FIG. 4 and be adapted to perform the method 410.

The arrangement 500 comprises a synchronization determiner (SYNC DET) 540, a time interval determiner (SSF DET) 550, a scheduler (SCHED) 560, a receiver (RX) 510, and a transmitter (TX) 520.

The synchronization determiner 540 is adapted to determine that there is a time shift between applicable time references as explained above, and the time interval determiner 550 is adapted to determine the duration of a dynamically shortened communication time interval based on the time shift. The scheduler 560 is adapted to schedule the determined communication time interval to a communication device and the transmitter 520 is adapted to transmit a scheduling message indicating the duration of the communication time interval to the communication device.

The receiver 510 may be adapted to receive a scheduling request message from the communication device and the synchronization determiner 540 may be adapted to determine that there is a time shift in response to the scheduling request.

The synchronization determiner 540 may be adapted to acquire the applicable time references when needed, for example, based on output from the receiver 510. To this end, the receiver 510 may be adapted to receive a network signaling message from a network node indicating the time reference applicable for that network node. Alternatively or additionally, the receiver 510 may be adapted to receive signals from the communication device applying the time reference, and the arrangement 500 (e.g. the receiver 510, the synchronization determiner 540, a measurement unit (not shown) or another part of the arrangement) may be adapted to perform measurements on the received signals to determine the time reference. Yet alternatively or additionally, the receiver 510 may be adapted to receive a report message from a communication device indicating the time reference applied by that device.

If applicable, as has been exemplified above, the transmitter 520 may be adapted to transmit data during the scheduled time interval and/or the receiver 510 may be adapted to receive data during the scheduled time interval.

The arrangement 500 may also comprise a processor (PROC) 530 adapted to administer the operation of the transmitter 520 based on the scheduler output. The processor 530 may for example be adapted to perform rate matching and/or puncturing to map data to the scheduled time interval.

FIG. 6 schematically illustrates an example arrangement 600 according to some embodiments. The arrangement may, for example, be comprised in a communication device such as the device 452 of FIG. 4 and be adapted to perform the method 450. The arrangement 600 comprises a receiver (RX) 610 adapted to receive a scheduling message indicating a duration of a shortened communication time interval as explained above. The arrangement also comprises a transmitter (TX) 620 and at least one of the transmitter and the receiver is adapted to perform data communication during the shortened communication time interval, the transmitter by transmitting data of the first data communication during the time interval and the receiver by receiving data of the first data communication during the time interval. The arrangement 600 may also comprise a controller (CNTR) 630 (e.g. in the form of a processor) adapted to administer the operation of the transmitter 620 and/or the receiver 610 in connection with communication in the time interval. The processor may for example be adapted to perform rate matching and/or puncturing to map transmission data to the time interval and/or to perform rate de-matching and/or de-puncturing to obtain data received in the time interval.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM 700 as is illustrated in FIG. 7. The computer readable medium 700 may have stored thereon a computer program comprising program instructions. The computer program may be loadable into a data-processing unit 730, which may, for example, be comprised in a network node 710. When loaded into the data-processing unit 730, the computer program may be stored in a memory 720 associated with or integral to the data-processing unit 730. According to some embodiments, the computer program may, when loaded into and run by the data-processing unit, cause the data-processing unit to execute method steps according to, for example, the methods shown in FIG. 4.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

For example, two or more of the synchronization determiner 540, the time interval determiner 550, the scheduler 560, the receiver 510, the transmitter 520 and the processor 530 may be implemented as a single physical entity. In some embodiments, the synchronization determiner 540, the time interval determiner 550 and the scheduler 560 are comprised in the same entity as the processor 530. Similarly, two or more of the receiver 610, the transmitter 620 and the controller 630 may be implemented as a single physical entity.

Hence, it should be understood that the limitations of the described embodiments are merely for illustrative purpose and by no means limiting. Instead, all variations that fall within the range of the claims are intended to be embraced therein.

The invention claimed is:

1. A method of radio resource allocation in a communication node, the method comprising:
   determining that a first time reference of a first data communication, using a first component carrier, of a first communication device has a time shift compared to a second time reference of a second data communication, using a second component carrier, of a second communication device;
   determining a duration of a communication sub-frame based on the time shift; and
   scheduling the determined communication sub-frame on the first component carrier to the first communication device.

2. The method of claim 1, further comprising transmitting a scheduling message indicating the duration of the communication sub-frame to the first communication device.

3. The method of claim 2, wherein the indication of the duration comprises at least one of:
   an ending time of the communication sub-frame;
   a starting time of the communication sub-frame; and
   a time offset of the sub-frame.

4. The method of claim 1, further comprising acquiring each of the first and second time references, wherein at least one of the time references is acquired by performing at least one of:
   receiving a network signaling message from a network node of a cellular communication network, the message indicating the time reference;
   performing measurements to determine the time reference, wherein the measurements are performed on signals from at least one of the first and second communication device; and
   receiving a report message from at least one of the first and second communication devices, the message indicating the time reference.

5. The method of claim 1, wherein the determining the duration of the communication sub-frame based on the time shift comprises
   determining the duration to be equal to the time shift.

6. The method of claim 5, wherein the method comprises transmitting data of the first data communication to the first communication device during the duration of the communication sub-frame that is equal to the time shift.

7. The method of claim 1, wherein:
   the communication node is a first network node of a cellular communication network;
   the first communication is between the first communication device and the cellular communication network;
   the second communication is between the second communication device and the cellular communication network; and
   the first component carrier is the same component carrier as the second component carrier;
   the first time reference is a synchronization of the first wireless communication device; and
   the second time reference is a synchronization of the second wireless communication device.

8. The method of claim 1, wherein:
   the communication node is a first network node of a cellular communication network;
   the first communication is between the first communication device and the cellular communication network;

the second communication is between the second communication device and the cellular communication network;

the first communication device is the same device as the second communication device;

the first time reference is a synchronization of the first component carrier; and the second time reference is a synchronization of the second component carrier.

9. The method of claim 1, wherein:

the communication node is the second communication device;

the first and second devices are device-to-device communication capable devices, and the first and second communications comprise device-to-device communication between the first and second communication devices;

the first component carrier is the same component carrier as the second component carrier;

the first time reference is a synchronization of the first communication device; and the second time reference is a synchronization of the second communication device.

10. The method of claim 1, wherein:

the communication node is a first network node of a cellular communication network;

the first and second devices are device-to-device communication capable devices, and the first and second communications comprise device-to-device communication between the first and second communication devices;

the first component carrier is the same component carrier as the second component carrier;

the first time reference is a synchronization of the first communication device; and the second time reference is a synchronization of the second communication device.

11. The method of claim 1, further comprising at least one of:

transmitting data of the first data communication to the first communication device during the communication sub-frame; and receiving data of the first data communication from the first communication device during the communication sub-frame.

12. The method of claim 1, wherein the determining the duration of the communication sub-frame based on the time shift comprises determining the duration to be equal to a transmission time interval minus the time shift.

13. The method of claim 1, wherein the determining comprises determining a first time reference for initial first data communication transmissions transmitted or received in one or more sub-frames, each of a nominal transmission time interval of duration n, and wherein the determining a duration of a communication sub-frame comprises determining a shortened sub-frame of a duration less than n for at least one subsequent first data communication transmission.

14. The method of claim 1, wherein the first communication device and the second communication device are different user equipment.

15. The method of claim 1, wherein the scheduling comprises scheduling the determined communication sub-frame to start transmission or reception at an indicated beginning or ending of a transmission time interval of the second communication device.

16. A method of radio resource utilization in a first communication device, the method comprising:

receiving a scheduling message indicating a duration of a communication sub-frame from a communication node; wherein the duration of the communication sub-frame is based on a time shift between a first time reference of a first data communication, using a first component carrier, of the first communication device and a second time reference of a second data communication, using a second component carrier, of a second communication device; and performing at least one of:

transmitting data of the first data communication during the communication sub-frame; and receiving data of the first data communication during the communication sub-frame.

17. A computer program product stored in a non-transitory computer readable medium for controlling radio resource allocation in a communication node, the computer program product comprising software instructions which, when run on one or more processing circuits of the communication node, causes the communication node to:

determine that a first time reference of a first data communication, using a first component carrier, of a first communication device has a time shift compared to a second time reference of a second data communication, using a second component carrier, of a second communication device;

determine a duration of a communication sub-frame based on the time shift; and schedule the determined communication sub-frame on the first component carrier to the first communication device.

18. A computer program product stored in a non-transitory computer readable medium for controlling radio resource utilization in a first communication device, the computer program product comprising software instructions which, when run on one or more processing circuits of the communication device, causes the communication device to:

receive a scheduling message indicating a duration of a communication sub-frame from a communication node; wherein the duration of the communication sub-frame is based on a time shift between a first time reference of a first data communication, using a first component carrier, of the first communication device and a second time reference of a second data communication, using a second component carrier, of a second communication device; and perform at least one of:

transmit data of the first data communication during the communication sub-frame; and receive data of the first data communication during the communication sub-frame.

19. A radio resource allocation arrangement for a communication node, the arrangement comprising a processor and a memory, the memory containing instructions executable by the processor whereby the radio resource allocation arrangement is configured to:

determine that a first time reference of a first data communication, using a first component carrier, of a first communication device has a time shift compared to a second time reference of a second data communication, using a second component carrier, of a second communication device;

determine a duration of a communication sub-frame based on the time shift; and schedule the determined communication sub-frame to the first communication device.

20. The radio resource allocation arrangement of claim 19, further comprising a transmitter configured to transmit a scheduling message indicating the duration of the communication sub-frame to the first communication device.

21. The radio resource allocation arrangement of claim 20, wherein the transmitter is further configured to transmit data of the first data communication to the first communication device during the communication sub-frame.

22. The radio resource allocation arrangement of claim 19:
wherein the memory contains instructions executable by the processor whereby the radio resource allocation arrangement is configured to determine the first time reference and the second time reference by acquiring each of the first and second time references;
further comprising a receiver configured to perform at least one of:
  receive a network signaling message from a network node of a cellular communication network, the message indicating the time reference;
  receive measurement signals suitable for determining the time reference from at least one of the first and second communication devices; and
  receive a report message from at least one of the first and second communication devices, the message indicating the time reference;
wherein at least one of the time references is acquired based on output from the receiver.

23. The radio resource allocation arrangement of claim 22, wherein the memory contains instructions executable by the processor whereby the radio resource allocation arrangement is configured to perform measurements on the measurement signals to determine the time reference.

24. The radio resource allocation arrangement of claim 22, wherein the receiver is further configured to receive data of the first data communication from the first communication device during the communication sub-frame.

25. The radio resource allocation arrangement of claim 19, wherein the memory contains instructions executable by the processor whereby the radio resource allocation arrangement is configured to determine the duration of the communication sub-frame based on the time shift as:
  equal to the time shift; or
  equal to a transmission time interval minus the time shift.

26. A communication node, comprising a processor and a memory, the memory containing instructions executable by the processor whereby the communication node is configured to:
  determine that a first time reference of a first data communication, using a first component carrier, of a first communication device has a time shift compared to a second time reference of a second data communication, using a second component carrier, of a second communication device;
  determine a duration of a communication sub-frame based on the time shift; and
  schedule the determined communication sub-frame to the first communication device.

27. The communication node of claim 26, wherein the communication node is a network node of a cellular communication network.

28. The communication node of claim 26, wherein the communication node is the second communication device.

29. A radio resource utilization arrangement for a first communication device, the arrangement comprising:
a receiver configured to receive a scheduling message indicating a duration of a communication sub-frame from a communication node, wherein the duration of the communication sub-frame is based on a time shift between a first time reference of a first data communication, using a first component carrier, of the first communication device and a second time reference of a second data communication, using a second component carrier, of a second communication device; and
a transmitter;
wherein at least one of:
  the transmitter is configured to perform the first data communication during the communication sub-frame by transmitting data of the first data communication during the communication sub-frame;
  the receiver is configured to perform the first data communication during the communication sub-frame by receiving data of the first data communication during the communication sub-frame.

30. A first communication device, comprising:
a receiver configured to receive a scheduling message indicating a duration of a communication sub-frame from a communication node, wherein the duration of the communication sub-frame is based on a time shift between a first time reference of a first data communication, using a first component carrier, of the first communication device and a second time reference of a second data communication, using a second component carrier, of a second communication device; and
a transmitter;
wherein at least one of:
  the transmitter is configured to perform the first data communication during the communication sub-frame by transmitting data of the first data communication during the communication sub-frame;
  the receiver is configured to perform the first data communication during the communication sub-frame by receiving data of the first data communication during the communication sub-frame.

* * * * *